(No Model.)

G. W. WRIGHT & A. E. FIELDEN.
GUARD FOR REVOLVING SET SCREWS.

No. 576,334. Patented Feb. 2, 1897.

Witnesses:
E. C. Wurdeman
S. Williamson

Inventors:
George W. Wright
Albert E. Fielden
By Geo. H. Holgate
Attorney

UNITED STATES PATENT OFFICE.

GEORGE W. WRIGHT AND ALBERT E. FIELDEN, OF PHILADELPHIA, PENNSYLVANIA, ASSIGNORS OF ONE-THIRD TO HENRY M. SCHADEWALD, OF SAME PLACE.

GUARD FOR REVOLVING SET-SCREWS.

SPECIFICATION forming part of Letters Patent No. 576,334, dated February 2, 1897.

Application filed April 21, 1896. Serial No. 588,482. (No model.)

*To all whom it may concern:*

Be it known that we, GEORGE W. WRIGHT and ALBERT E. FIELDEN, citizens of the United States, residing at Philadelphia, in the county of Philadelphia and State of Pennsylvania, have invented certain new and useful Improvements in Guards for Revolving Set-Screws and the Like, of which the following is a specification.

Our invention relates to a new and useful improvement in guards or shields for the projecting parts of machinery, such as set-screws and bolts which revolve, and are therefore liable to become entangled with the clothing or other parts of persons working about the machinery, which in many instances causes serious injury to said persons, if not their death.

The object of our invention is to provide a cheap and simple device of this description which may be secured to any portion of a shaft while the latter is in its bearings and be so adjusted as to completely house a projecting bolt or set-screw, thereby overcoming the difficulties above enumerated.

With these ends in view our invention consists in the details of construction and combination of elements hereinafter set forth and then specifically designated by the claim.

In order that those skilled in the art to which this invention appertains may understand how to make and use the same, we will describe its construction and operation in detail, referring by letter to the accompanying drawings, forming a part of this specification, and in which—

Figure 1:
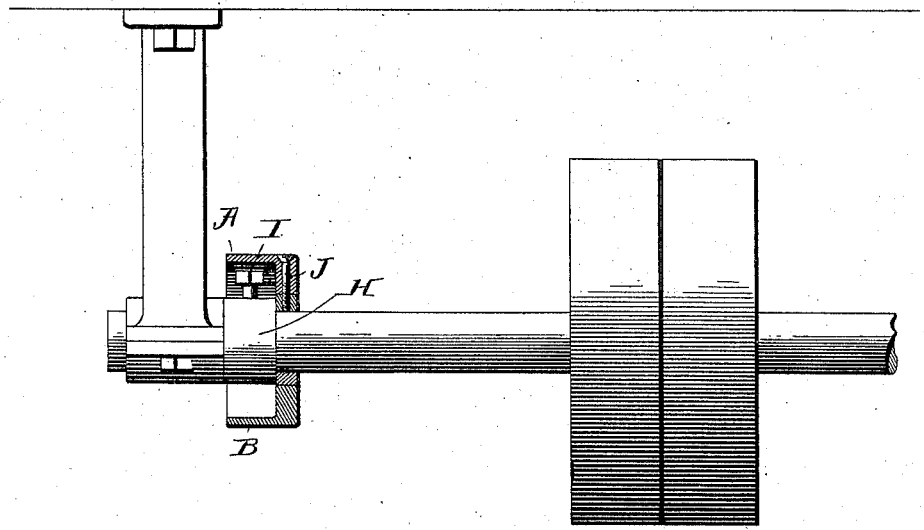
Figure 2:
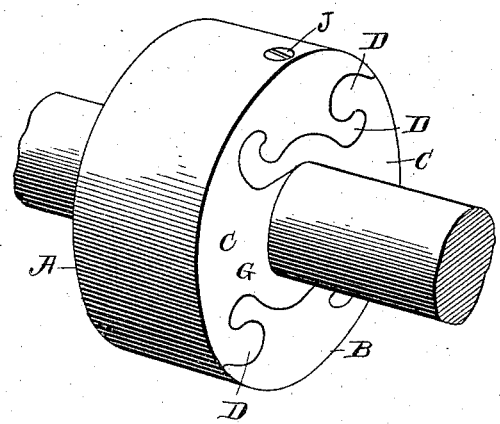
Figure 3:
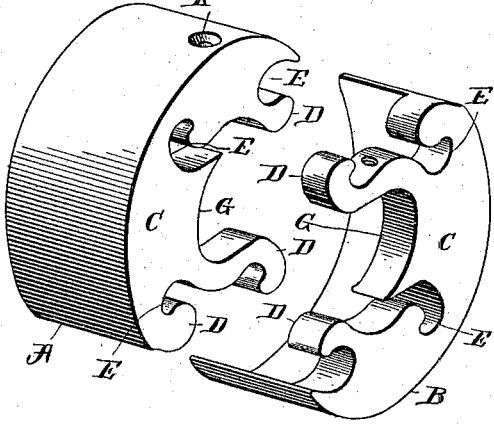

Figure 1 is a side elevation of a shaft in its proper position within a hanger, showing our improvement in section applied thereto for the protection of a set-screw used to hold a collar upon said shaft to withstand the end thrust thereof; Fig. 2, a perspective of our improvement in position upon a section of shaft, and Fig. 3 a detail of the two halves of our improvement before being applied to a shaft.

Referring to the drawings in detail, A and B represent the two halves of the guard, which are made semicircular and provided with flanges, so that when they are matched together they complete a cylinder of cup shape. The closed end of this cylinder is formed by each half thereof being provided with an irregular-shaped section C, of such contour as to form tongues D and grooves E, into which said tongues are adapted to fit, so as to securely hold the halves together when said tongues and grooves are engaged. To apply this device to a shaft, the halves are separated and each placed over the shaft so that the semicircular notch G rests against the shaft, and the halves are then moved toward each other longitudinally, so as to bring the tongues and grooves into engagement with each other, as clearly shown in Fig. 2, and when thus alined the completed device may be slid upon the shaft, so as to bring its flanges over a collar, such as shown at H, thereby inclosing the set-bolt I. Now by running the set-screw J within the threaded holes K and L until the lower end of said screw comes in contact with the shaft with sufficient force to cause the guard to revolve with said shaft it will be seen that the guard and collar will revolve in unison. The set-screw J also serves to hold the two halves of the guard in lengthwise alinement to prevent the disengagement of the tongues and grooves, as will be readily understood.

When the projecting set-bolt of a collar is thus protected, it will be seen that it is impossible for said bolt to become entangled with surrounding objects, and as the guard is cylindrical and its outline is smooth no injury would be inflicted upon a person even though they were to come in direct contact with said guard.

It is obvious that this improvement may be used to protect the set-screws of pulleys placed in the hubs of tight pulleys by the flange thereof projecting over said screws in the same manner as that described in connection with the collar H.

In shop practice a cap-screw is often used to close the oil-hole in the hub of a loose pulley, and when this is the case the head of this screw may be also protected from entanglement with surrounding objects by securing the guard to the shaft upon which said pulley is revolving so that the flange thereof will inclose the hub and screw of the pulley and permit them to revolve therein.

We are aware that slight modifications in the construction here shown and described may be made without departing from the spirit of our invention.

Having thus fully described our invention, what we claim as new and useful is—

The herein-described combination of the halves A and B, tongues and grooves formed with said halves adapted to interlock so as to hold said halves in their proper relative positions upon a shaft, and a screw J threaded through suitable holes in said halves, whereby the latter are held in longitudinal alinement and prevented from slipping upon the shaft, substantially as and for the purpose set forth.

In testimony whereof we have hereunto affixed our signatures in the presence of two subscribing witnesses.

GEORGE W. WRIGHT.
ALBERT E. FIELDEN.

Witnesses:
S. S. WILLIAMSON,
MARK BUFORD.